US008249856B2

(12) United States Patent
Shen et al.

(10) Patent No.: US 8,249,856 B2
(45) Date of Patent: Aug. 21, 2012

(54) MACHINE TRANSLATION

(75) Inventors: Libin Shen, Needham, MA (US); Jinxi Xu, Framingham, MA (US); Ralph M. Weischedel, Canton, MA (US)

(73) Assignee: RAYTHEON BBN Technologies Corp., Cambridge, MA (US)

( * ) Notice: Subject to any disclaimer, the term of this patent is extended or adjusted under 35 U.S.C. 154(b) by 1129 days.

(21) Appl. No.: 12/052,555

(22) Filed: Mar. 20, 2008

(65) Prior Publication Data

US 2009/0240487 A1    Sep. 24, 2009

(51) Int. Cl.
*G06F 17/28* (2006.01)

(52) U.S. Cl. .................. 704/2; 704/9; 704/277

(58) Field of Classification Search .................. 704/2, 9, 704/277
See application file for complete search history.

(56) References Cited

U.S. PATENT DOCUMENTS

| 5,528,491 | A * | 6/1996 | Kuno et al. ........................ 704/9 |
| 6,031,993 | A * | 2/2000 | Andrews et al. .............. 717/143 |
| 6,356,865 | B1 * | 3/2002 | Franz et al. ........................ 704/2 |
| 6,442,524 | B1 * | 8/2002 | Ecker et al. ........................ 704/9 |
| 2005/0108630 | A1 * | 5/2005 | Wasson et al. ................ 715/513 |
| 2005/0114771 | A1 * | 5/2005 | Piehler et al. ................. 715/536 |
| 2008/0162117 | A1 * | 7/2008 | Bangalore et al. .............. 704/10 |

OTHER PUBLICATIONS

C. Quirk, A. Menezes, and C. Cherry. 2005. Dependency treelet translation: Syntactically informed phrasal SMT. In Proceedings of the 43th Annual Meeting of the Association for Computational Linguistics (ACL), pp. 271-279, Ann Arbor, Michigan.

Charniak et al., "Syntax-Based Language Models for Statistical Machine Translation,", 2003
D. Chiang. 2005. A hierarchical phrase-based model for statistical machine translation. In Proceedings of the 43th Annual Meeting of the BBN Proprietary Copyright 2004 BBNT Solutions LLC p. 4 Rev. Apr. 1, 2005 Association for Computational Linguistics (ACL).
D. Chiang. 2007. Hierarchical phrase-based translation. Computational Linguistics, 33(2).
D. Magerman. 1995. Statistical decision-tree models for parsing. In Proceedings of the 33$^{rd}$ Annual Meeting of the Association for Computational Linguistics.
D. Marcu, W. Wang, A Echihabi, and K. Knight. 2006. Spmt: Statistical machine translation with syntactified target language phrases. In Proceedings of the 2006 Conference of Empirical Methods in Natural Language Processing.
F.J. Och and H. Ney. 2003. A systematic comparison of various statistical alignment models. Computational Linguistics, 29(1).

(Continued)

*Primary Examiner* — Jakieda Jackson
(74) *Attorney, Agent, or Firm* — Occhiuti Rohlicek & Tsao LLP

(57) ABSTRACT

A method for computer-assisted translation from a source language to a target language makes use of number of rules. Each rule forms an association between a representation of a sequence of source language tokens with a corresponding tree-based structure in the target language. The tree-based structure for each of at least some of the rules represents one or more asymmetrical relations within a number of target tokens associated with the tree-based structure and provides an association of the target tokens with the sequence of source language tokens of the rule. An input sequence of source tokens is decoded according to the rules to generate a representation of one or more output sequences of target language tokens. Decoding includes, for each of at least some sub-sequences of the input sequence of source tokens, determining a tree-based structure associated with the sub-sequence according a match to one of the plurality of rules.

26 Claims, 13 Drawing Sheets

OTHER PUBLICATIONS

F.J. Och. 2003. Minimum error rate training for statistical machine translation. In Erhard W. Hinrichs and Dan Roth, editors, Proceedings of the 41st Annual Meeting of the Association for Computational Linguistics (ACL), pp. 160-167, Sapporo, Japan, July.

H. Fox. 2002. Phrasal cohesion and statistical machine translation. In Proceedings of the 2002 Conference of Empirical Methods in Natural Language Processing.

Huang, Liang and David Chiang, "Better κ-best Parsing,", Oct. 2005.

J. Graehl and K. Knight. 2004. Training tree transducers. In Proceedings of the 2004 Human Language Technology Conference of the North American Chapter of the Association for Computational Linguistics.

Joakim Nivre, "Dependency Grammar and Dependency Parsing,", 2005.

K. Papineni, S. Roukos, and T. Ward. 2001. Blwu: a method for automatic evaluation of machine translation. IBM Research Report, RC22176.

M. Galley, J. Graehl, K. Knight, D. Marcu, S. DeNeefea, W. Wang, and I. Thayer. 2006. Scalable inference and training of context-rich syntactic models. In COLINGACL 06: Proceedings of 44th Annual Meeting of the Association for Computational Linguistics and 21st Int. Conf. on Computational Linguistics.

M. Galley, M. Hopkins, K. Knight, and D. Marcu. 2004. What's in a translation rule? In Proceedings of the 2004 Human Language Technology Conference of the North American Chapter of the Association for Computational Linguistics.

M. Palmer, D. Gildea, and P. Kingsbury. 2005. The proposition bank: An annotated corpus of semantic roles. Computational Linguistics, 31(1).

M. Snover, B. Dorr, R. Schwartz, L. Micciulla, and J. Makhoul. 2006. A study of translation edit rate with targeted human annotation. In Proceedings of Association for Machine Translation in the Americas.

Michael Collins, "Head-Driven Statistical Models for Natural Language Parsing,", 1999.

Nizar Habash, "The Use of a Structural N-gram Language Model in Generation-Heavy Hybrid Machine Translation,", 2004.

S. DeNeefe, K. Knight, W. Wang, and D. Marcu. 2007. What can syntax-based mt learn from phrase-based mt? In Proceedings of the 2007Conference of Empirical Methods in Natural Language Processing.

S. Shieber and Y. Schabes. 1990. Synchronous tree adjoining grammars. In Proceedings of COLING 90: The 13th Int. Conf. on Computational Linguistics.

W. Wang, K. Knight, and D. Marcu. 2007. Binarizing syntax trees to improve syntax-based machine translation accuracy. In Proceedings of the 2007 Conference of Empirical Methods in Natural Language Processing.

Y. Ding and M. Palmer. 2005. Machine translation using probabilistic synchronous dependency insertion grammars. In Proceedings of the 43th Annual Meeting of the Association for Computational Linguistics (ACL), pp. 541-548, Ann Arbor, Michigan, June.

\* cited by examiner

Dependency Tree

CFG Parse Tree

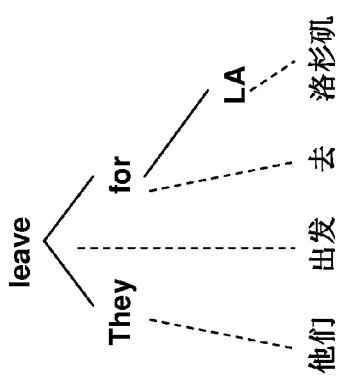
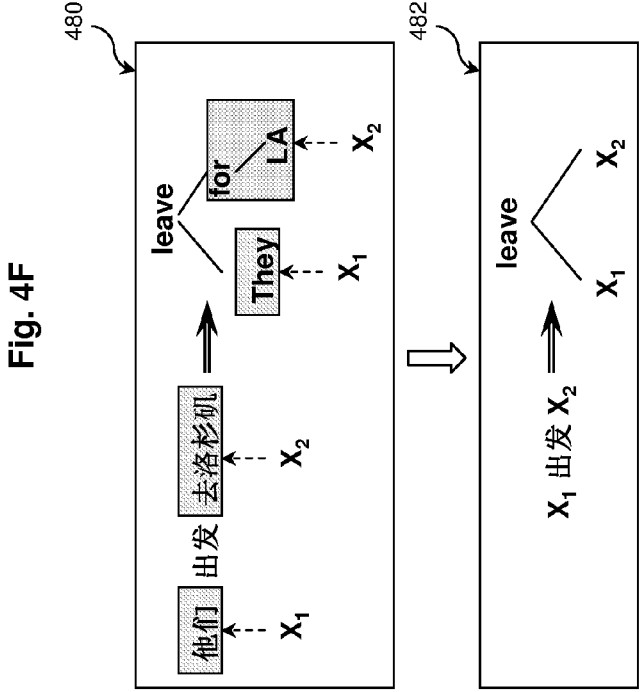
Fig. 4F
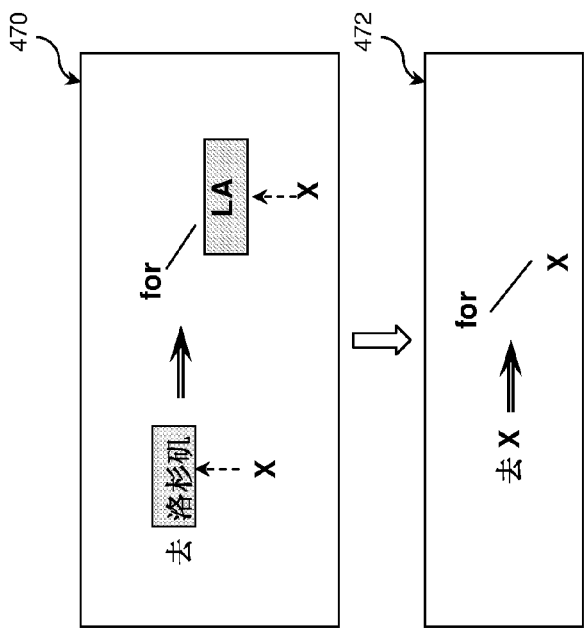
Fig. 4E
Fig. 4H
Fig. 4G

TABLE 1: A TYPICAL SET OF TRANSFER RULES

| IDENTIFIER | CHINESE | ENGLISH | COUNTS |
|---|---|---|---|
| R1 | 。 ⟹ | | 7894 |
| R2 | 的 ⟹ | of | 4645 |
| R3 | 去 ⟹ | for | 590 |
| R4 | 约翰 ⟹ | John | 49 |
| R5 | 出发 ⟹ | leaves | 80 |
| R6 | 去 X ⟹ | for \ X | 78 |
| R7 | 去 X ⟹ | to \ X | 56 |
| R8 | $X_1$ 出发 $X_2$ ⟹ | leave / \ $X_1$ $X_2$ | 60 |
| R9 | $X_1$ 出发 $X_2$ ⟹ | leaves / \ $X_1$ $X_2$ | 40 |
| ⋮ | ⋮ | ⋮ | ⋮ |

Fig. 4I

约翰出发去洛杉矶
Fig. 6A
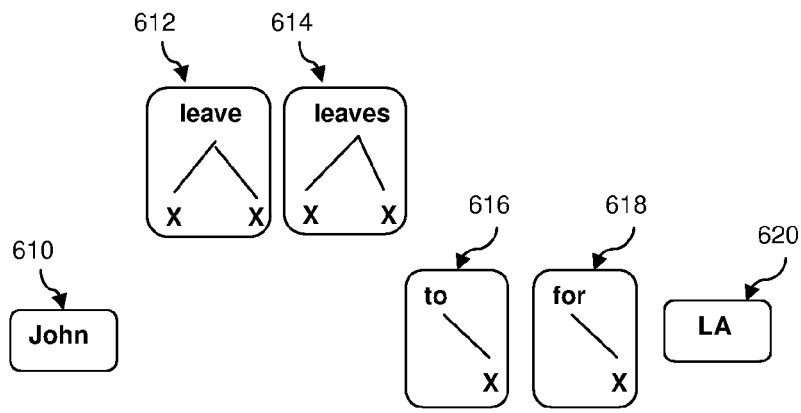
Fig. 6B
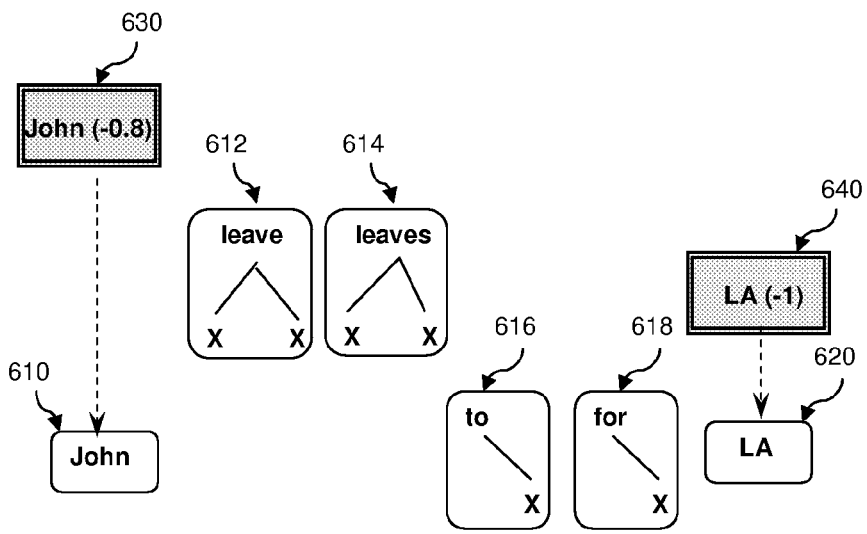
Fig. 6C

1. // N = string length (i.e., total number of tokens in a string)
2. // K = span length (i.e., number of tokens in a span [i, j])
3. For K from 1 to N
4.     For i from 1 to N-K+1
5.         Set j = i+K-1;
6.         Find Q = the set of transfer rules completely aligned to span [i, j];
7.         Use cube pruning to generate target dependency structure
            (including theories) and compute scores for theories;
8.         Find P = the set of transfer rules that partially match span [i, j];
            // P used for finding Q in a larger span
9.     End For
10. End For

Fig. 7A

INPUT STRING: 约翰 出发 去 洛杉矶
TOKEN INDEX: 1 2 3 4

| SPAN [i, j] | Q (COMPLETELY ALIGNED RULES) | TARGET TREELETS | P (PARTIALLY ALIGNED RULES) |
|---|---|---|---|
| K=1 | | | |
| [1, 1] | 约翰 => John ... | John (-0.8) ... | $X_1$ · 出发 $X_2$ => $X_1$ --leaves -- $X_2$<br>$X_1$ · 出发 $X_2$ => $X_1$ --leave -- $X_2$<br>... |
| [2, 2] | ... | ... | ... |
| [3, 3] | | | 去 · X => to -- X<br>去 · X => for -- X<br>... |
| [4, 4] | 洛杉矶 => LA ... | LA (-1) ... | ... |
| K=2 | | | |
| [1, 2] | ... | ... | $X_1$ 出发· $X_2$ => $X_1$--leaves-- $X_2$<br>$X_1$ 出发· $X_2$ => $X_1$--leave -- $X_2$<br>... |
| [2, 3] | ... | ... | |
| [3, 4] | 去 X => to -- X<br>去 X => for – X<br>... | to -- LA (-2.1)<br>for -- LA (-2.5)<br>... | ... |
| K=3 | | | |
| [1, 3] | ... | ... | ... |
| [2, 4] | ... | ... | ... |
| K=4 | | | |
| [1, 4] | $X_1$ 出发 $X_2$ => $X_1$-- leave -- $X_2$<br>$X_1$ 出发 $X_2$ => $X_1$--leaves --$X_2$<br>... | John -- leave -- to-- LA. (-6.1)<br>John -- leave -- for-- LA. (-5.8)<br>John -- leaves -- to -- LA. (-5.4)<br>John -- leaves -- for – LA. (-5.1)<br>... | ... |

Fig. 7B

MACHINE TRANSLATION

GOVERNMENT RIGHTS

Aspects of the invention described in this document were made with government support under contract HR001-06-C-0022 awarded by the Defense Advanced Research Projects Agency (DARPA). The government has certain rights in the invention.

BACKGROUND

This invention relates to machine translation.

Machine translation, in general, makes use of computers to automate some or all of the process of translating text or speech from one natural language to another. One major field in machine translation, possibly the most widely studied to date, is statistical machine translation (SMT). Using statistical models developed from the analysis of bilingual text corpora (a process called training), SMT aims at generating an output in a target language (e.g., English) that maximizes some key value function (e.g., representing faithfulness or fluency) given an input in a source language (e.g., Chinese). SMT systems are generally not tailored to any specific pair of languages, and do not necessarily require manual development of extensive linguistic rules. Such manual development of rules can be both expensive and inefficient.

The field of SMT has evolved over the years. In its early stages, many translation systems were developed using a word-based approach. That is, by treating words as the basic translation elements, each source language word was substituted by a target language word to form a translated sentence. The probability of such sentence being a good translation is approximated using the product of the probabilities that each target language word is an appropriate translation of the corresponding source language word, and using a language model probability for the sentence in the target language. For example, a Markov Chain ("N-gram") language model was used to determine the language model probability. One aspect of an N-gram language model is that it can be difficult to capture long-range dependencies in a word sequence. In the recent decade, significant advances were made with the introduction of an improved phrase-based approach. By expanding the basic unit of translation from words to phrases (i.e., substrings of a few consecutive words), a phrasal approach can effectively reduce search space for SMT.

Many existing phrase-based SMT systems still suffer from several disadvantages. For example, although they may robustly perform translations that are localized to a few consecutive words that have been recognized in training, most existing systems do not account for long-distance word dependency. For example, learning non-contiguous phrases, e.g., English-French pairs as simple as "not"→"ne . . . pas", can still be difficult in current phrasal systems.

In some approaches to machine translation, the translation process makes use of tree structures, for example using content-free grammars, in both the source language and the target language. Such approaches may have poor accuracy in cases in which an accurate source language tree structure is not available, for example, due to deficiencies in the representation of the source language.

SUMMARY

In one aspect, in general, a method is directed to computer-assisted translation from a source language to a target language. A number of rules are accepted. Each rule forms an association between a representation of a sequence of source language tokens with a corresponding tree-based structure in the target language. The tree-based structure for each of at least some of the rules represents one or more asymmetrical relations within a number of target tokens associated with the tree-based structure and provides an association of the target tokens with the sequence of source language tokens of the rule. An input sequence of source tokens is decoded according to the rules to generate a representation of one or more output sequences of target language tokens. Decoding includes, for each of at least some sub-sequences of the input sequence of source tokens, determining a tree-based structure associated with the sub-sequence according a match to one of the plurality of rules.

Aspects may include one or more of the following features.

The tree-based structure for each rule comprises a dependency tree. In some examples, each of at least some of the dependency trees are represented in a training corpus of target language token sequences.

Each of at least some of the dependency trees comprise a number of nodes, with each of the nodes being associated with a target language token and being associated with a sequence of one or more source language tokens. In some examples, each of at least some of the dependency trees comprises a node associated with a wildcard representing an association with an unspecified sequence of source language tokens.

Determining a tree-based structure associated with the sub-sequence according a match to one of the plurality of rules comprises combining a number of tree-based structures each determined to be in association with a portion of the sub-sequence.

Combining the tree-based structures comprises associating one of the tree-based structures with a wildcard associated with a node of another tree-based structure of the plurality of tree-based structures.

Each of the tree-based structures is associated with a target language model score that depends on the tree-based structure and target language tokens associated with the tree-based structure.

Decoding the input sequence of source tokens includes combining target language model scores associated with a plurality of tree-based structures.

In another aspect, in general, a method is directed to computer-assisted translation from a source language to a target language. A number of rules are accepted. Each rule forms an association between a representation of a sequence of source language tokens with a corresponding tree-based structure in the target language. The tree-based structure for each rule satisfies a tree-based constraint and includes at least one target language token associated with one or more source language tokens in the sequence of source language tokens for the rule. An input sequence of source tokens is decoded according to the rules to generate a representation of one or more output sequences of target language tokens. The decoding includes, for each of at least some sub-sequences of the input sequence of source tokens, determining a tree-based structure associated with the sub-sequence according a match to one of the rules. Decoding further includes, for each of at least some sub-sequences of the input sequence of source tokens, selecting for combination a subset of determined tree-based structures, each associated with associated with a sub-sequence, such that a tree-based structure formed as a combination of the subset of partial trees satisfies the tree-based constraint, and determining the tree-based structure as the combination of the selected subset of tree-based structures.

Aspects may include one or more of the following features.

The tree based constraint comprises membership in one of a plurality of specified classes of tree-based structures.

One class of tree-based structures includes fixed tree-based structures. At least some of the fixed tree-based structures have a determined head and optionally one or more children of the determined head. Each child of the determined head is a complete tree-based structure without wildcards.

Another class of tree-based structures includes floating tree-based structures. At least some of the floating tree-based structures have an undetermined head and one or more children of the undetermined head. Each child of the undetermined head is a complete tree-based structure without wildcards.

For each of the rules, the tree-based structure in the target language comprises a dependency tree.

Each of the dependency trees includes one or more nodes each associated with a target language token.

Each rule forms a direct association between the sequence of source language tokens and the corresponding tree-based structure in the target language.

In another aspect, in general, a method is directed to computer-assisted translation from a source language to a target language. A number of rules are accepted. Each rule associates a representation of a source sequence with a corresponding tree-based structure in the target language. The tree-based structure includes at least one target language token associated with a source token in the source sequence. The tree-based structure is associated with a target language model score that depends on the tree-based structure and one or more target language tokens associated with the tree-based structure. An input sequence of source tokens is decoded according to the rules to generate a representation of one or more output sequences of target language tokens. Decoding includes, for each of multiple sub-sequences of the input sequence, generating a tree-based structure associated with the sub-sequence according to the rules, including determining a score associated with the generated tree-based structure that includes a language model component based on one or more language model scores of tree-based structures of the rules, and determining whether to discard the generated tree-based structure based on the determined score.

Aspects may include one or more of the following features.

The language model component comprises a dependency tree based language model component.

Generating the tree-based structure associated with the sub-sequence includes combining multiple tree-based structures determined for corresponding portions of the sub-sequence. Determining the score for the generated tree-based structure then includes combining scores for the multiple tree-based structures.

Decoding the input sequence further includes generating a full tree structure associated with the entirety of the input sequence using generated tree-based structures that were not determined to be discarded.

Decoding the input sequence further includes generating the one or more output sequences in the target language based on the full tree structure.

In another aspect, in general, a method is directed to forming rules for computer-assisted translation from a source language to a target language. A training corpus comprising a number of paired token sequences is accepted. One sequence of each pair is a sequence of source language tokens and another sequence of the pair is a sequence of target language tokens. The method includes, for each of the paired token sequences, identifying a tree-based structure corresponding to the sequence of source language tokens of the paired token sequence, the tree-based structure representing one or more asymmetrical relations within a plurality of target tokens associated with the tree-based structure and provides an association of the plurality of target tokens with the sequence of source language tokens of the rule. For at least some of the paired token sequences, one or more partial tree-based structures are identified, the partial tree-based structure being formed by substituting a first part of the tree-based structure with an element representing an unspecified sequence of source language tokens, the first part of the tree-based structure corresponding to a first part of the sequence of source language tokens of the paired token sequence. The rules are formed such that each rule is associated with either one of the identified tree-based structures corresponding to a sequence of source language tokens of a paired token sequence or one of the partial tree-based structures.

Aspects may include one or more of the following features.

Each of the tree-based structures comprises a dependency tree, and each of the partial tree-based structures comprises a dependency tree.

The first part of the tree-based structure satisfies a tree-based criterion, and the partial tree-based structure satisfies the tree-based criterion.

In another aspect, in general, software embodied on a computer readable medium includes instructions for causing a data processing system to perform all the steps of any of the methods presented above.

In another aspect, in general, a system is configured to perform all the steps of any of the methods presented above.

Aspects can include one or more of the following advantages.

In contrast to translation approaches that map trees in a source language to trees in the target language, by generating a direct association between a target tree (e.g., consisting only of English words) and a source string (e.g., consisting only of Chinese words) without string-tree conversion on the source side, the approach may provide increased robustness. That is, incomplete or inaccurate modeling of the source language may not be as detrimental as in an approach in which a valid source language tree representation is needed.

Introduction of scores, and in particular target language model scores, into the decoding procedure allows efficient pruning of low probability theories. Furthermore, use of a tree-based target language model, such as a dependency tree language model, allows for representation of relatively long-distance linguistic effects without increasing the complexity of the language model. The combination of early pruning and modeling of long-range statistical effects provides higher accuracy with relatively lower computation as compared with existing approaches.

Compared with the use of other dependency structures in constructing transfer rules, well-formed dependency structures can have several advantages. For example, it helps increase the coverage of non-constituent rules. In addition, the well-formedness of the dependency structures enables efficient decoding through dynamic programming. Moreover, by excluding a huge number of dubious rules of irregular structures, this well-formedness constraint provides better generalization capability and avoids overfitting caused by an uncontrolled grammar.

Other features and advantages of the invention are apparent from the following description, and from the claims.

DESCRIPTION OF DRAWINGS

FIGS. 4A-4H are diagrams that illustrate extracting rules from an aligned training pair.

FIG. 4I is a table that shows a typical set of transfer rules.

FIGS. 5B and 6A-6F are diagrams that illustrate one implementation of decoding.

FIG. 7A is pseudo code illustrating another implementation of decoding.

FIG. 7B is a table of exemplary rules and target treelets generated using algorithm described in the pseudo code.

DESCRIPTION

1 System Overview

Figure 1:
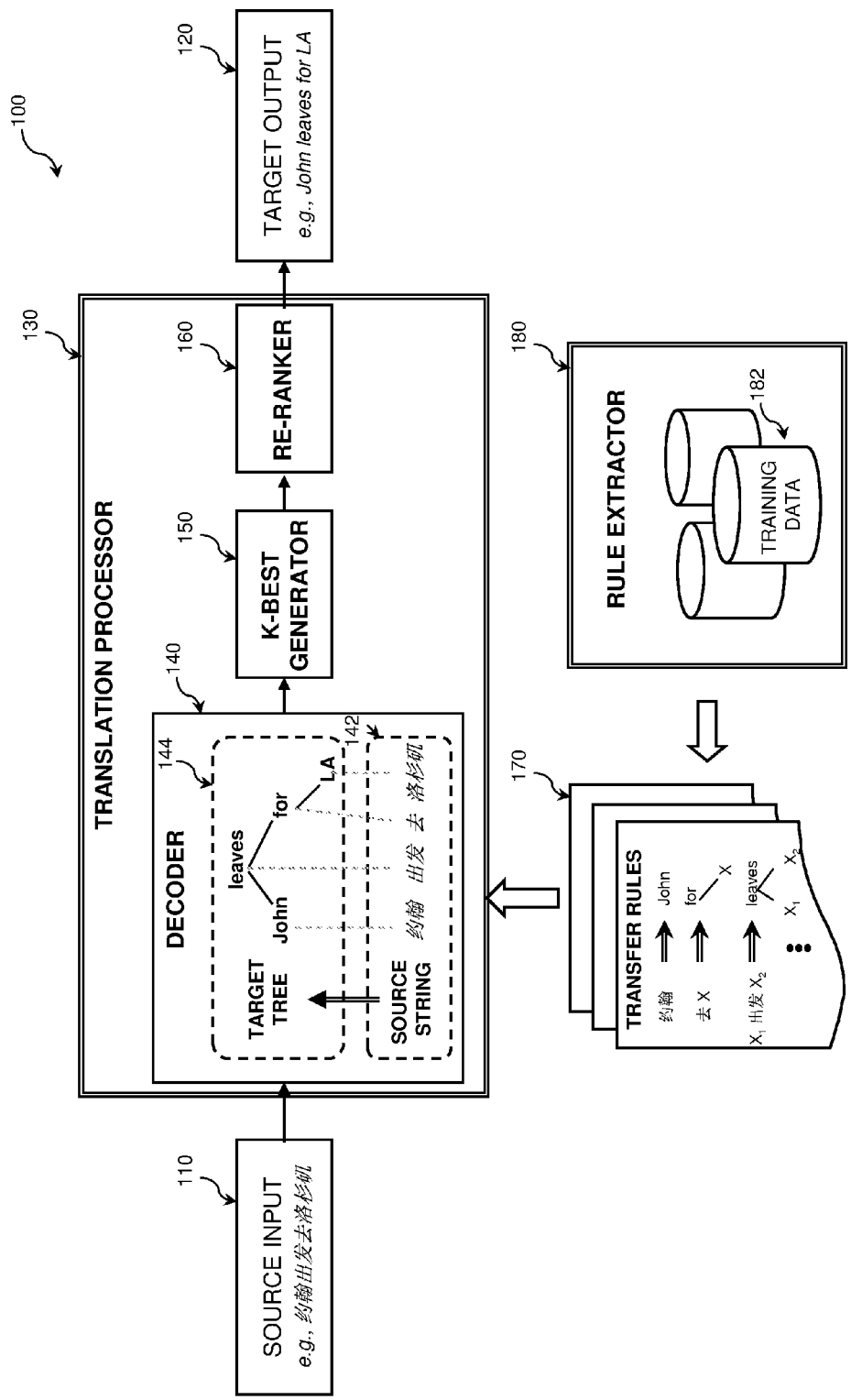
FIG. 1 is a data flow diagram for a statistical machine translation procedure.

Referring to FIG. 1, an exemplary SMT system 100 accepts a source input 110, which represents a text input in a source language (e.g., Chinese). A translation processor 130 translates the input 110 to a corresponding target output 120, which represents a text output in a target language (e.g., English). In some examples, the translation processor 130 is a software based module hosted on a general purpose computing device (e.g., a computer), and is coupled to an input unit (e.g., a keyboard) for accepting the source input 110 and an output unit (e.g., a monitor) for presenting the decoded target output 120.

It should be understood that the procedures described below may be hosted or embedded in a variety of special or general purpose devices using hardware and/or software modules with instructions stored on machine readable media. In some examples described below, the source input is described as a single sentence for illustration. It should be understood that the techniques described are applicable to various types of textual input, which can include a single string of words, or multiple strings of words (e.g., sentences and paragraphs). In some examples, the translation processor 130 iteratively processes portions of the input in sequence using the techniques described below.

In some implementations, the translation processor 130 employs several internal functional blocks to decode the source input 110. These functional blocks include e.g., a decoder 140, a k-best generator 150, and a re-ranker 160.

The decoder 140, in general, has an overall function of accepting a source string 142 (which is represented by the source input 110) and generating a representation of one or more typically multiple target trees 144 (the representation for multiple trees being referred to as a "forest"). Very generally, the decoder 140 recognizes individual constituents (e.g., a word or a group of words) in the source string 142, maps each constituent to one or several intermediate structures (referred to herein as "treelets") in the target language, and builds upon these treelets a full tree structure 144 to represent an output string. In general, the full tree structure 144 represents multiple individual trees. Each individual tree represents a single output string that is meant to form a translation of the input string 142. That is, the decoder implements a string-to-tree transformation process, with each target tree specifying a corresponding target string.

To illustrate operation of the decoder 140, consider an input Chinese string "约翰出发去洛杉矶". One full target tree 144 generated by the decoder 140 has four English words including "John," "leaves," "for," and "LA," (corresponding to source word sequences "约翰," "出发," "去,"and "洛杉矶,"respectively). This particular target tree represents an output string of "John leaves for LA".

A second block of the translation processor 130 is the k-best generator 150. Very generally, the k-best generator 150 accepts the full tree structure 144, and generates a subset of the "best" individual trees represented by the full tree structure. For example, the k-best list can include 100 target trees with the highest probability scores based on a statistical translation model. Each of these individual trees represents an output string corresponding to the input string.

A third block of the translation processor 130 is the re-ranker 160, which re-scores the k-best target trees using scoring criteria that are not necessarily represented in the procedure used in the decoder 140 and k-best generator 150. For example, the re-ranker 160 may use more complex language models or take into account overall context of the input and background information. Based on the result of this re-ranking, the re-ranker 160 identifies the top target tree and generates a corresponding output string to be the target output 120 that best represents a translation of the source input 110. For example, "John leaves for LA" is generated by the translation processor 130 as the best translation for the input "约翰出发去 洛杉矶".

In some examples of the process outlined above, the decoder 140 is governed by rules, including transfer rules and operation rules.

A transfer rule, in general, describes a mapping of words from one language to another. Here, more specifically, a transfer rule defines an association between a source sequence and a target treelet. In this description, a source sequence can be a source string, a portion of a source string, or a sequence having at least a portion of a source string and possibly wild card elements. A treelet refers to a partial tree structure that can be combined by the decoder with others to build tree structures of larger size (i.e., larger treelets or full trees). For example, a treelet can be a single-node treelet (such as "John"), or a multi-node treelet (such as a treelet having a root node "for" and a child "LA").

Transfer rules are accessible by the decoder 140 for generating trees, and they are preferably pre-stored in a large database, which can be referred to as grammar 170. Examples of transfer rules in this grammar include e.g., "约翰→John" and "去 X→for —X", as illustrated in FIG. 1.

In some examples of the system 100, a rule extractor 180 develops the grammar 170 by automatically extracting rules from bilingual training data 182. The training data 182 can include, for example, a Chinese-English training corpus that has millions of Chinese sentences aligned with their English translations and/or their corresponding full trees. The rule extractor 180, very generally, scans the training corpus to find possible transfer rules that associate Chinese sequences with English treelets, and determines statistical parameters (e.g., probabilities) associated with those rules.

Based on transfer rules, the decoder 140 finds treelets that are associated with pieces of the input string, and moves on to build the full target tree 144. This building of the full target tree is guided by operation rules.

An operation rule governs the combining treelets such that the decoder 140 is allowed to combine treelets in a limited number of ways. For example, one operation, called adjoining, allows the decoder 140 to replace one node in a first treelet with a second treelet to obtain a larger treelet. In this case, the first and second treelets become a child and parent treelet, respectively. Another operation, called concatenation, allows two treelet to be combined in a lateral manner without changing any one of their internal nodes. In this concatenation case, these two treelets are sibling treelets.

Using both transfer rules and operation rules, the decoder 140 essentially parses the source string in a bottom-up fashion. Prior to describing decoding in greater details in a later section, the overall flow of decoding in briefly introduced here. In some examples, the decoder 140 begins by enumerating transfer rules that are associated with at least a portion of the input string, and finding the corresponding target treelets according to the transfer rules. Next, as guided by operation rules, larger treelets are formed by valid combinations of small treelets, and evaluated at each point.

During decoding, each treelet has an associated score, for example, a probability score indicative of the likelihood of this treelet is both a good translation of the corresponding words of the source string and is a likely word sequence in the target language according to a target language model. As treelets are combined, their scores are also combined and propagated through the decoding procedure. In some examples, a pruning procedure is performed during decoding such that, for example, if the score of a treelet fails to pass a threshold, that treelet is pruned (i.e., deleted or removed from further consideration) so that the decoder 140 can essentially focus computation resources on combinations and orderings of high quality treelets. Decoding continues to represent the entire input string, with one or more full target trees, each tree corresponding to a possible translation of the source string.

2 Tree Structures

Figure 2B:
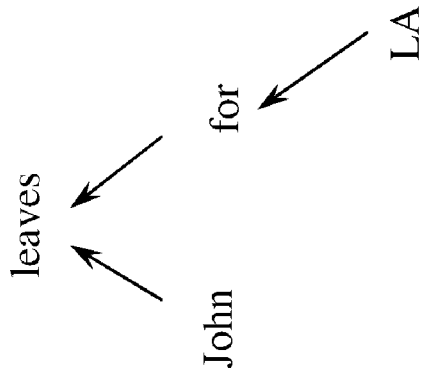
FIGS. 2A and 2B are examples of a CFG parse tree and a dependency tree, respectively.
Figure 2A:
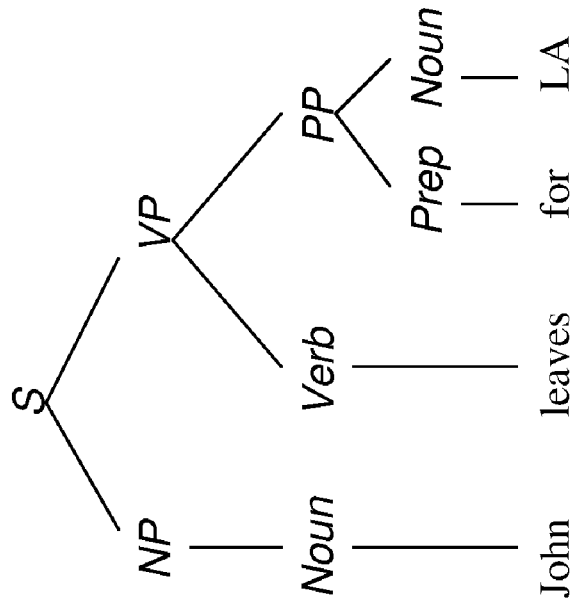

Referring to FIGS. 2A and 2B, two examples of tree structures for representing structure of a word sequence are shown. In FIG. 2A a context-free grammar (CFG) parse trees represent a tree structure of an English string "John leaves for LA". This CFG tree uses both terminal symbols at the leaves of the tree and non-terminal symbols at interior nodes of the tree to reflect the structure of this sentence. While terminals generally refer to the actual words in the string (e.g., "John" and "leaves"), non-terminals are constituent labels that express the clusters or generalizations of words (e.g., "NP" and "VP" are used to address noun phase and verb phrase, respectively). As shown in FIG. 2A, at the stop of the CFG tree is a start symbol "S" that represents a sentence. Stemming from "S" are two non-terminals "NP" and "VP", which means the sentence is structured at the highest level as a NP followed by a VP. In this example, NP is simply a proper noun, whereas the VP consists of a verb and PP (prepositional phrase) that further breaks down to a preposition and a noun. At the bottom of the tree, these four labels of the smallest constituents (i.e., noun, verb, prep and noun) are mapped to terminals in the string of "John leaves for LA".

A probability distribution over possible parse trees can make use of a probability that each rule, such as S→NP VP, is applied in the CFG tree.

Referring to FIG. 2B, another tree-structured representation uses a dependency tree. Unlike the CFG tree discussed above, a dependency tree does not include constituent labels in the structure. Both the leaves of the tree and the interior nodes of the tree are labeled with words (or more generally phrases if phrasal tokens can be used). Here, word to word relationships are described based on a dependency language model. That is, for a given sentence, each word has a parent word which it depends on, with the exception of the root word which is already at the top of the hierarchy. In this example, dependent relations are reflected in the tree by dependency branches leading from a child word to its direct parent, such as from "LA" to "for" and from "John" to "leaves" ("leaves" also happens to be the root word in this sentence). Advantageously, dependency tree can reveal long-distance relations between words, and structures deeply imbedded in sentences. In addition, by directly modeling semantic structure of a sentence, dependency trees provide a desirable platform to employ linguistic knowledge in machine translation.

In some examples, at each node of a dependency tree, the children are grouped into left children and right children, and the children are ordered. A probability distribution over possible dependency trees can be based on a probability of a root wood, and probabilities of left and right children words given their parent words. The particular structure of such a probability distribution is described further below.

Referring to the dependency tree in FIG. 2B, for example, the probability of the tree can be determined using the following formula:

$$P_T = P_{Head}(\text{leaves}) * P_{Left}(\text{John}|\text{leaves-as-head}) * P_{Right}(\text{for}|\text{leaves-as-head}) * P_{Right}(\text{LA}|\text{for-as-head})$$

where $P_T$ is the dependency LM score of the entire tree, $P_{Head}$ (leaves) is the probability of "leaves" occurring as a head of a tree, $P_{Left}$ (John|leaves-as-head) is the probability of "John" being a left child given "leaves" as its head, $P_{Right}$ (for|leaves-as-head) is the probability of "for" being a right child given "leaves" as its head, and $P_{Right}$ (LA|for-as-head) is the probability of "LA" being a right child given "for" as the head.

In examples of the SMT system 100 described below, the decoder 140 uses dependency tree for decoding purpose. It should be understood that the techniques described can also be adapted to make use of CFG tree structures, with corresponding different transfer and operation rules. For the purpose of brevity, in the following sections, the operations of rule extraction and decoding will be described primarily in the context of dependency tree. In this context, a full tree refers to a full dependency tree, and a partial tree structure (e.g., a treelet) refers to a partial dependency tree structure (e.g., a dependency treelet). It is however expected that a person of ordinary skill in the art will be able to apply similar methodology to systems using CFG trees.

3 Rule Extraction

Figure 3:
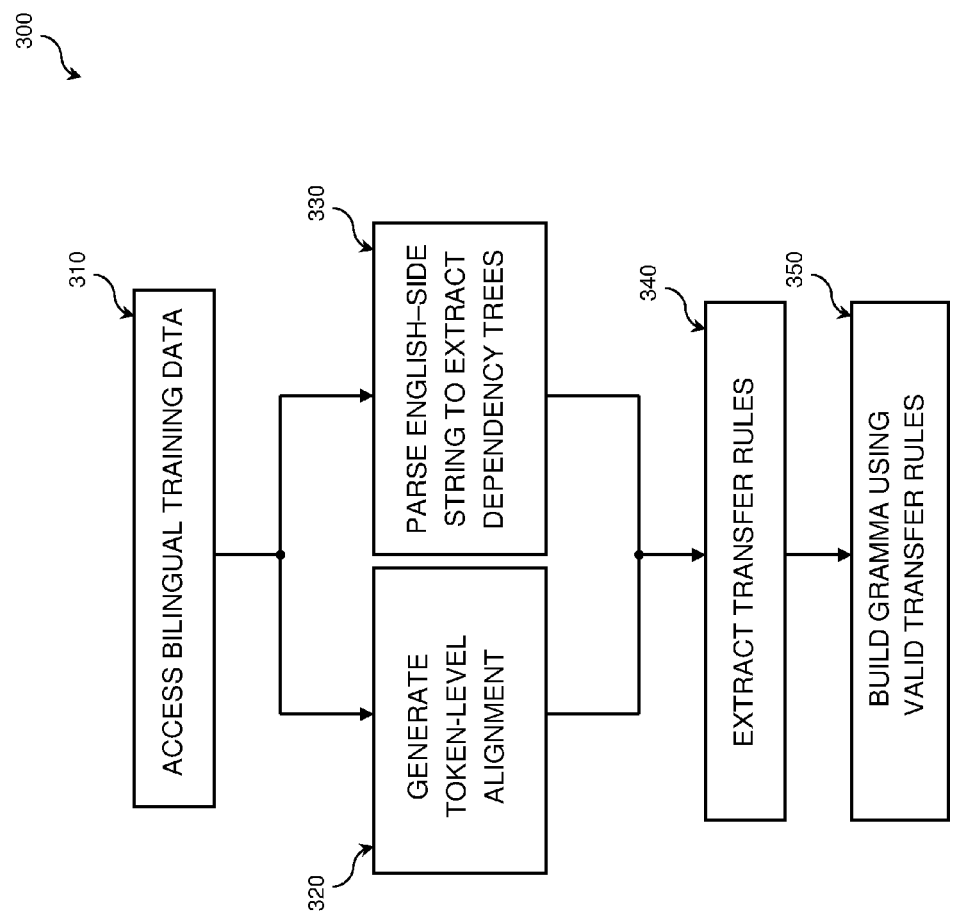
FIG. 3 is a flow diagram that illustrates the steps executed during rule extraction.

Referring to FIG. 3, in some implementations, the overall operation of the rule extractor 180 is shown in flow diagram 300. Note that in the discussion above, the strings in the source and target languages are described for sake of example as consisting of sequences of words. More generally, the strings are treated as sequences of tokens. Here, a token is a group or segment of elementary units of texts that is identified during a text normalization process. In general, this text normalization process converts texts into a normalized form for the consistency of text processing. As there are a variety of ways of text normalization, the corresponding definition of a token may vary depending on the implementation. In some implementations, a token may correspond to a piece of word (such as "anti-"), a word ("Boston"), a phrase (such as "Los Angeles"), a punctuation mark (such as period and comma), or any other linguistic unit that can be identified for processing purpose (e.g., "A.M."). In some implementations, a token can also be a syntactic token, which can be the result of syntactic processing. For example, a token that represents a comma followed by a quotation mark does not necessarily convey semantic information to a reader, but carries one syntactic characteristic of the English language—that is, when something is being quoted and followed immediately by a comma, the comma usually sits inside the quotation mark Oust the opposite as in Chinese). Therefore, in general, in the discussion below strings are described as being made up of sequences of tokens.

The rule extractor 180 first accesses the bilingual training data 182 (e.g., a Chinese-English corpus), as indicated in step 310. The training corpus includes a large number of sentence pairs. Each pair includes two aligned sentences that are translations of each other, one sentence being in a first language (also referred to as a source language), and the other sentence being in a second language.

The rule extractor 180 also makes use of a dependency tree in the target language. In some examples, the dependency tree is provided as part of the training data 182, while in other examples, the dependency tree is computed by the rule extractor 180 as part of the rule generation process. Below, the rule extractor 180 is described as computing the trees rather than accepting them as part of the training data.

Next, for each sentence pair, if not already provided as part of the training corpus, the rule extractor 180 generates token-level alignment to find associations between tokens, as indicated in step 320. That is, given a sentence "I like LA" as the English version of "我喜欢洛杉矶", the rule extractor learns that the English token "I" corresponds to Chinese token "我", "like" corresponds to two Chinese tokens "喜欢", and "LA" corresponds to three Chinese tokens "洛杉矶". Such associations indicate that an aligned portion of the target sentence is a translation of the portion of the source sentence to which it is aligned. In some examples, the rule extractor can use publicly available computer programs to generate token-level alignment, such as the GIZA++ system described by Och et al. in A SYSTEMATIC COMPARISON OF VARIOUS STATISTICAL ALIGNMENT MODELS, *Computational Linguistics*, 2003.

In addition to generating these token alignments, if not already available in the training corpus, the rule extractor 180 also parses the English side sentences to extract target dependency trees, as indicated in step 330. The dependency tree identifies a head token (which can be a word or a phrase) as well as dependencies between all of the tokens in the sentence. Subsequently, associations of source tokens in the source sentence with nodes in the target dependency tree follow based on the token-level alignment. An example of such a dependency tree is shown earlier in FIG. 2B.

At this point in processing, the rule extractor has obtained for each sentence pair in the training data, token to token alignment (in step 320) as well as the English-side dependency tree (in step 330). Based on the outputs of these two steps, the rule extractor extracts transfer rules, in some examples using a recursive heuristic procedure, as indicated in step 340. Among all the transfer rules enumerated in step 340, the rules extractor identifies valid transfer rules and subsequently builds a grammar that can be used later in decoding, as indicated in steps 350.

As previously discussed, a transfer rule associates a source sequence (which has one or multiple source tokens) with a corresponding target treelet (which has target tokens to which the source tokens are aligned). A transfer rule can be a constituent rule, in which the source sequence is a constituent (e.g., a word, or a phrase). A transfer rule can also be a non-constituent rule, in which the source sequence can be a non-constituent element (e.g., non-phrasal words "the red").

In some implementations, at least some of the transfer rules are string-to-dependency transfer rules. That is, a source string is associated with a target dependency tree. A string-to-dependency transfer rule R can be represented by a 4-tuple:

$$R = <S_f, S_e, D, A> \quad (1)$$

where $S_f$ is a source string, $S_e$ is a target string, D represents the dependency structure for $S_e$, and A is the alignment between $S_f$ and $S_e$. In string-dependency transfer rules, both the source and target string can contain terminals (i.e., words), and non-terminals (referred to herein as wildcards). Note non-terminal alignments in A are one-to-one. That is, if the source string contains a wildcard, this wildcard is aligned to exactly one wildcard in the target string, and vice versa. In some examples, the rule extractor may apply heuristics to restrict the length of the string or the number of wildcards per string to a maximum of M (e.g., M=2) for programming purposes.

In some embodiments, the rule extractor adopts extraction criteria to place structural constraints (e.g., a "well-formedness" constraint) on the dependency structure D allowed in a transfer rule. That is, only rules in which the dependency structure belongs to a particular structural group in compliance with the structural constraints is a valid transfer rule. For example, with a well-formedness constraint, the rule extractor allows only well-formed dependency structures on the target side of transfer rules, and excludes ill-formed dependency structures from the grammar.

There are many different implementations of well-formedness constraints on dependency structures in transfer rules. In some implementations, a well-formed dependency structure can be one of the following two kinds. In one kind, it can be a fixed dependency structure, where the head is known or fixed and all the children of the head are complete. For example, a head of "apple" with a left child "the" is a fixed structure because "apple" is the fixed head and its child "the" is complete. Another well-formed dependency structure is a floating dependency structure, where sibling nodes share a common head but the head itself is unspecified or floating. For example, an unspecified head node with left children "the" and "red" is a floating structure because siblings "the" and "red" share an unknown head, which might, for example, be "apple," "orange," "bike," or any other noun. As can be seen, floating structures can represent many linguistically meaningful non-constituent structures, just like "the red", a modifier of a noun.

To further illustrate the operation of rule extraction, two exemplary training sessions are discussed in the following sections.

Figure 4A:
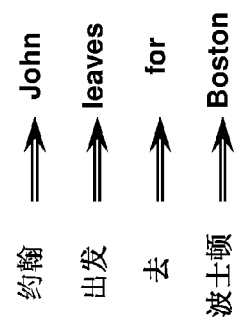

Referring to FIGS. 4A to 4D, in one training session, the rule extractor 180 obtains from the bilingual training data 182 one sentence pair, in which a Chinese sentence "约翰出发去波士顿" is aligned to an English sentence "John leaves for Boston". Within the two sentences, the rule extractor 180 links a portion (i.e., subsequence of tokens, for example, corresponding to a word or a phrase) of the Chinese string to a corresponding portion of the English string for token-level alignment. Here, at least four token-to-token alignments can be drawn from the words, including "约翰"to "John", "出发"to "leaves", "去"to "for", and "波士顿"to "Boston", as shown in FIG. 4A. Meanwhile, the rule extractor 180 parses "John leaves for Boston" into a group of tokens, and places each token in a dependency tree according to its dependency relations with others, also shown in FIG. 4A. A set of transfer rules are extracted from the information illustrated in FIG. 4A.

Figure 4B:
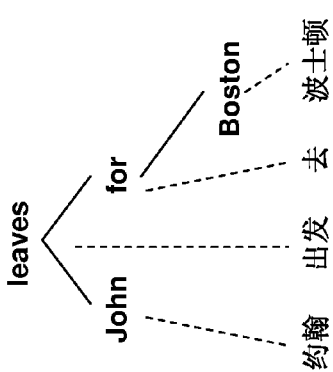

Each of the alignments of a portion of the source string to a node in the dependency tree is used to form a simple constituent rule, in which each target token at a node is associated with (e.g., carries the same meaning as) the source word or sequence of words, as shown in FIG. 4B.

Figure 4C:
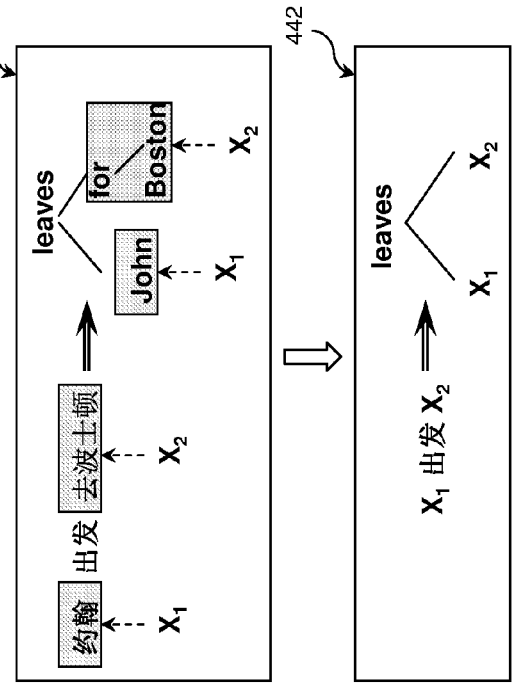

Portions of the source string that correspond to multiple nodes in the dependency tree are also used to form rules, in which a dependency structure is used to represent the target phrase. One example of a phrasal rule is rule 430 "去波士顿→for Boston", as shown in FIG. 4C. The rule extractor 180 can consider all subsequences of source tokens associated with multiple nodes, or optionally, limit the length of such subsequences according to the number of source tokens or the number of nodes in the dependency tree.

A phrase alignment is also used to form valid rule templates in which there are one or more corresponding pairs of wildcards, one wildcard of the pair replacing a portion (e.g., a single node or a treelet) of the dependency tree and the other wildcard of the same pair replacing the token or sequence of tokens in the source string corresponding to the replaced portion of the tree. Similarly, rules can be formed by replacing a portion of a dependency treelet and its corresponding source tokens with a pair of wildcards.

For example, referring to FIG. 4C again, when the source phrase in rule 430 contains a subphrase/word aligned to another in the target phrase, i.e., "波士顿"and "Boston", replacing the subphrase/word with a wildcard X in each language creates a new rule 432.

This exemplary new rule 432 effectively indicates that any Chinese string composed of ""去"" and a substring could be translated to an English string compose of "for" and the English version of the substring conforming to the dependency structure specified in the rule. The wildcard serves as a place holder which, during decoding, can be filled on the source side by a string of tokens and on the target side by a corresponding tree structure.

Figure 4D:
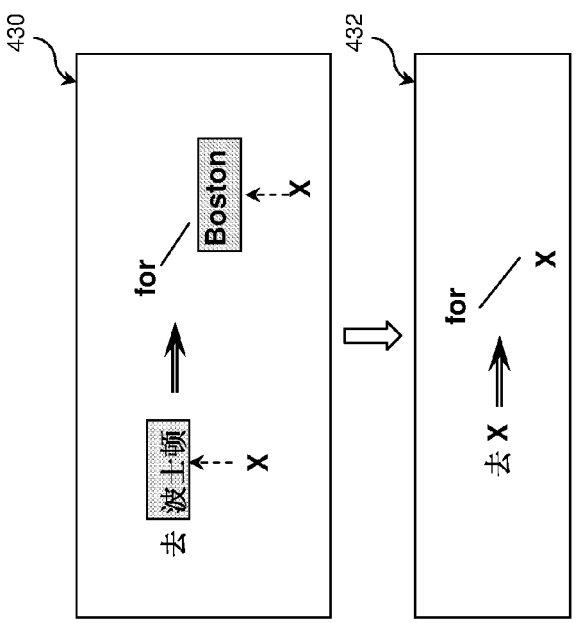

FIG. 4D shows another example of creating a new rule 442 by substituting two subphrases on each side of an existing rule 440 with wildcards $X_1$ and $X_2$, respectively. In some examples, the rule extractor 180 limits the number of wildcards allowable in the source string (e.g., two or fewer) for the purpose of simplicity.

Referring to FIGS. 4E to 4H, in another training session, rules are extracted from a different sentence pair of "他们出发去洛杉矶"and "They leave for LA". Again, token-level alignments are generated and the English sentence is parsed into a dependency tree, as shown in FIG. 4E.

Four simple constituent rules are first obtained from token alignments, as shown in FIG. 4F. Phrase alignment "去洛杉矶"to "for LA" is used to create rule 470, which also serves as a rule template for creating new rule 472, as shown in FIG. 4G. Likewise, placing two wildcards on both the source and target side in rule 480 yields another new rule 482, as shown in FIG. 4H.

Note that in some implementations, the rule extractor restricts valid transfer rules to those whose target side is a well-formed dependency treelet. In the cases that a target-side wildcard is used, it replaces a well-formed portion of the original well-formed target dependency treelet. That is, the replaced portion as well as the original treelet are well-formed dependency treelets.

Referring now to FIGS. 4C and 4G, rule 472 is identical to rule 432, but generated from different training sentences. That is, one rule can be created multiple times from different training sentences. In some implementations, the rule extractor keeps track of the occurrence of each rule when it scans through the entire training data. Such statistical information can be useful later in decoding. For example, a probability distribution over possible treelets is associated with any particular subsequence of source tokens.

Table 1 in FIG. 4I shows a typical set of transfer rules obtained from the training data. Each rule in the table has a rule identifier in the far left column. The right-most column has a total count of the number of times each rule appears in the training corpus. For example, R1, which associates a period in Chinese to a period in English, appears as the most frequently extracted rule in training. Rules R8 and R9, the two rules that each associates the Chinese string "$X_1$ 出发$X_2$" to a different target tree, are counted 60 and 40 times, respectively. If "$X_1$ 出发$X_2$" is only associated with rules R8 and R9 in the entire grammar, then the probability of applying rule R8 as corresponding to "$X_1$ 出发$X_2$" is 0.6 while the probability of applying rule R9 is 0.4.

4 Translation Process

Figure 5A:
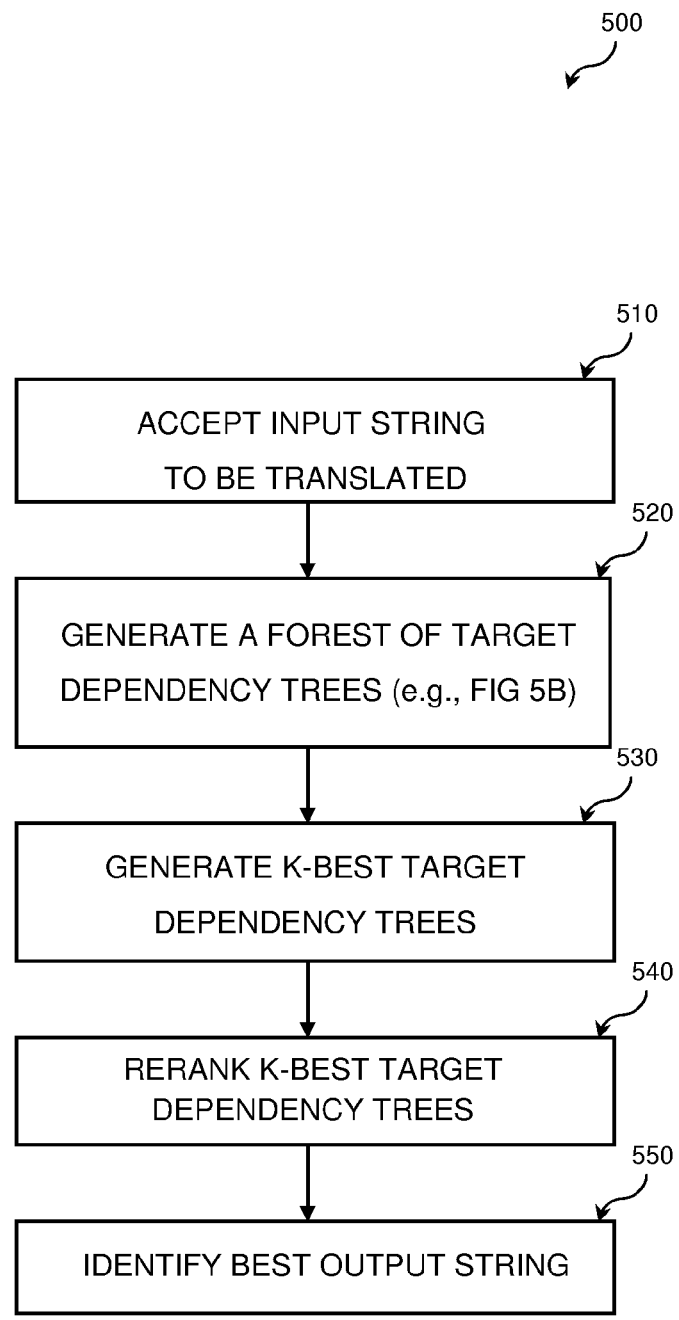
FIG. 5A is a flow diagram illustrating the overall translation procedure carried out by the translation processor.

Referring to FIG. 5A, a flow diagram 500 illustrates the overall operation of the translation procedure carried out by the translation processor 130 (see FIG. 1). As described earlier, the decoder 140 in the translation processor 130 accepts an input string that needs to be translated (step 510), and generates a forest of full target dependency trees to represent the entire input string (step 520). Based on these target dependency trees, the k-best generator 150 generates a subset of the "best" individual trees (step 530). Subsequently, the re-ranker 160 re-scores the k-best target dependency trees using scoring criteria (step 540), and based on the result of re-ranking selects the top target tree to generate the ultimate output string that best represents a translation of the input string (step 550).

In some implementations, the above translation procedure is carried out by the translation processor 130 using the techniques described below.

4.1 Decoding

Figure 5B:
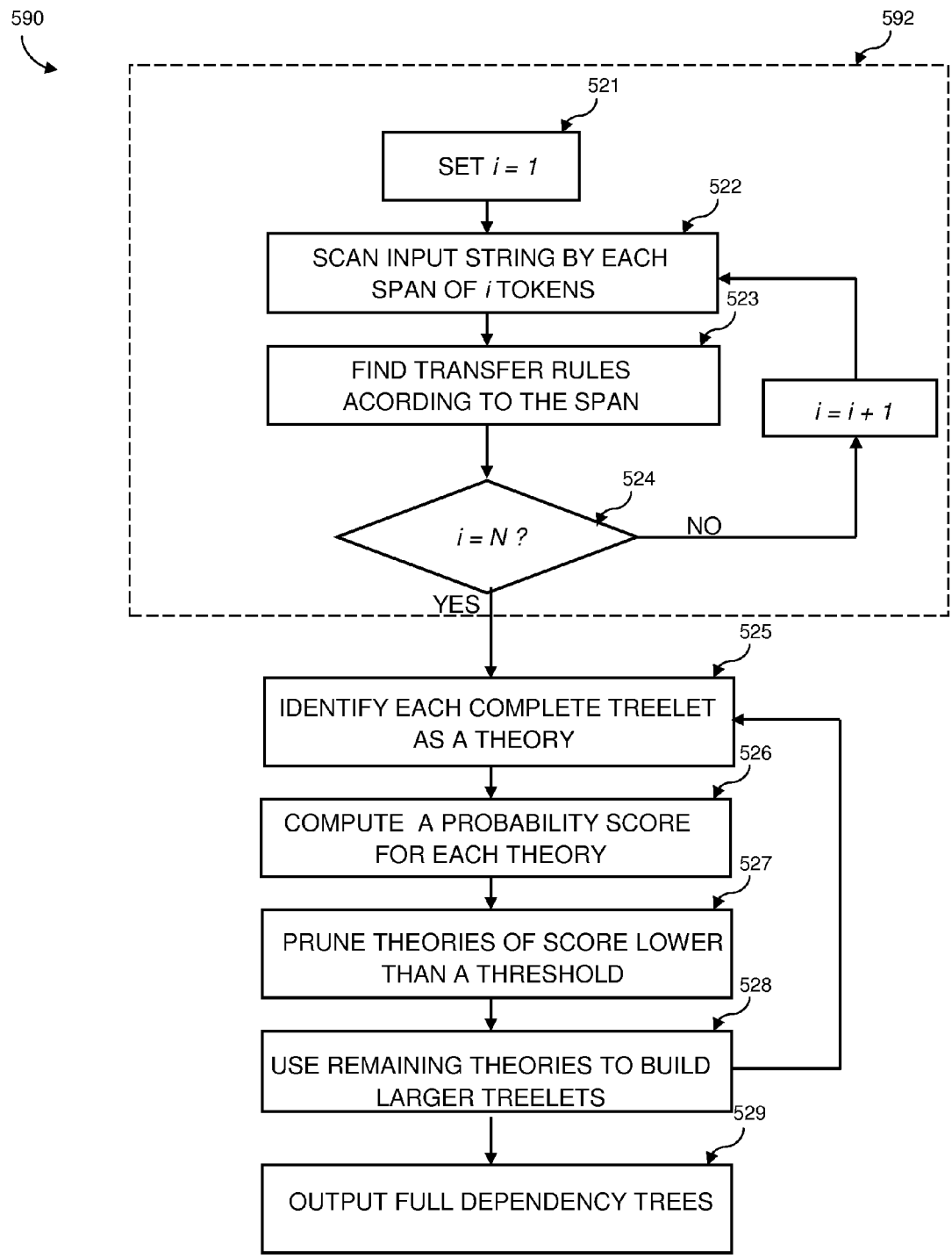

Referring to FIG. 5B, in some examples, the decoder 140 generates target dependency trees following the procedures illustrated in flow diagram 590. The description of this flow diagram is given below with reference to a specific decoding example illustrated in FIGS. 6A-6F.

Initially, the decoder 140 scans the input string to identify transfer rules that are associated with at least a portion of the input string. In some examples, this scanning process 592 proceeds as follows (steps 521 to 524).

In step 521, an initial value of 1 is assigned to an iteration variable i. This variable i guides the decoder, in step 522, to identify sequences in the input string having an exact span of i tokens. For example, given i=1, the decoder identifies input sequences each composed of exactly 1 token.

The decoder 140 then searches the grammar 170 for transfer rules in which the source side is associated with one of the identified input sequences, in step 523. These transfer rules are stored in a dynamic treelet database, e.g., using a memory space allocated by the translation processor 130 upon accepting the input string.

Having found transfer rules associated with sequences of i tokens, the decoder 140 increases the span i by 1 token at a time, and repeats steps 522 and 523 until i reaches N (i.e., a pre-determined limit on the length of a source sequence). As a result, the dynamic rule database contains transfer rules that each associates a target treelet with an input sequence, the input sequence having a length of no more than N tokens. In some examples, N equals the total number of tokens in the input string. In some other examples, N is smaller to the total number of tokens in the input string.

The following example shows some of the target treelets generated by the decoder 140 using the scanning procedure 592 outlined above (steps 521 to 524).

Referring to FIGS. 6A and 6B, the decoder 140 accepts an input string "约翰出发去洛杉矶"and segments the string into tokens. In this example, each one of "约翰", "出发", "去",and "洛杉矶"is treated as a single token. Scanning the input string by sequences of single token (i.e., i=1) thus yields four input sequences. For each sequence, the decoder identifies the corresponding transfer rules in the grammar. For example, according to the transfer rules listed in Table 1 (see FIG. 4I), the decoder 140 finds, at least, a single-node treelet 610 for token "约翰", a single-node treelet 620 for token "洛杉矶", two treelets 612 and 614 for token "出发", and two treelets 616 and 618 for token "去", as shown in FIG. 6B. As the decoder continues to scan sequences of two or more tokens, more target treelets can be identified (although not shown in the figure).

Referring now again to the flow diagram in FIG. 5B, by the end of the scanning process 592, the decoder 140 has collected a set of transfer rules and the corresponding target treelets in the dynamic treelet database.

In a next step 525, the decoder searches in the dynamic treelet database for complete treelets and subsequently defines each complete treelet as a theory. Here, a treelet that includes no wildcard nodes is considered to be complete, whereas a treelet having at least one wildcard node is considered to be incomplete. For example, in FIG. 6C, both treelets 610 and 620 are complete, and thus are considered as theories 630 and 640, respectively.

For each theory, the decoder 140 computes an associated score (e.g., a probability score), in step 526. In general, the score of a theory is indicative of the likelihood of this theory being both a good translation of the corresponding input sequence and a good representation of the likely word sequence in the target language according to a target language model.

In some examples, a probability score can include a language model (LM) component e.g., determined based on a Markov Chain language model. The probability score can also include a dependency language model (DLM) component e.g., determined based a target dependency language model. In the decoding example shown in FIG. 6C, theory 630 has a log probability score of −0.8 while theory 640 has a log probability score of −1.

Although only two theories are illustrated in this decoding example in FIG. 6C, in general, the decoder 140 may identify many theories (e.g., 1000) from the dynamic treelet database for a given input string. In some examples, a pruning step 527 is performed such that, if a theory fails to pass a threshold, that theory is deleted or removed from the dynamic treelet database so that the decoder can essentially focus its computation resources on the combination and ordering of high quality theories.

After pruning, the decoder 140 combines the remaining theories and incomplete treelets to generate new treelets, in step 528.

As discussed previously, combining treelets is governed by operation rules. In some implementations, a valid treelet combination includes the use of at least one theory and one incomplete treelet. The combination results in a new treelet that can be either a complete treelet, or an incomplete treelet. For example, a new treelet formed by replacing the only wildcard in an incomplete treelet with a theory is a complete treelet. A new treelet formed by replacing one of the multiple wildcards in an incomplete treelet with a theory is an incomplete treelet.

The decoder 140 identifies each new complete treelet as a new theory, and subsequently computes a probability score for the theory, as previously illustrated in steps 525 and 526. New theories that survive the pruning step 520 are then made available for combination with other treelets in the dynamic treelet database to generate additional new treelets.

Figure 6D:
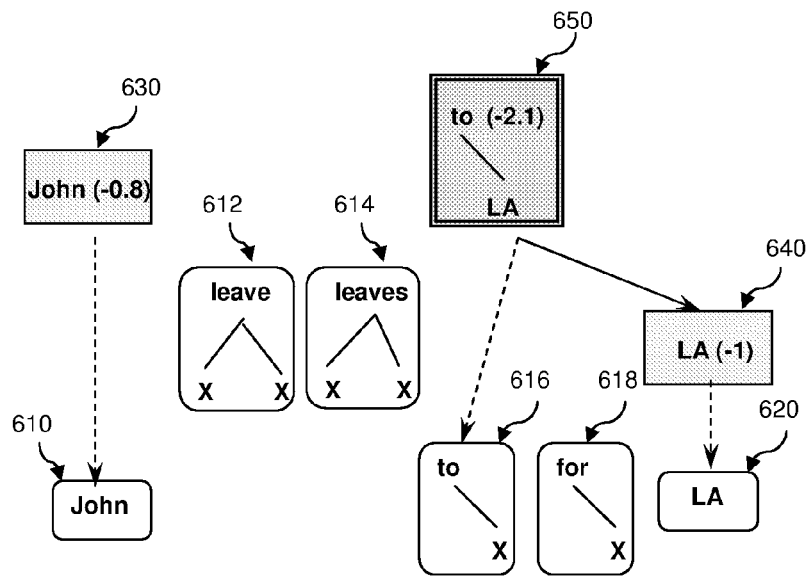
Figure 6E:
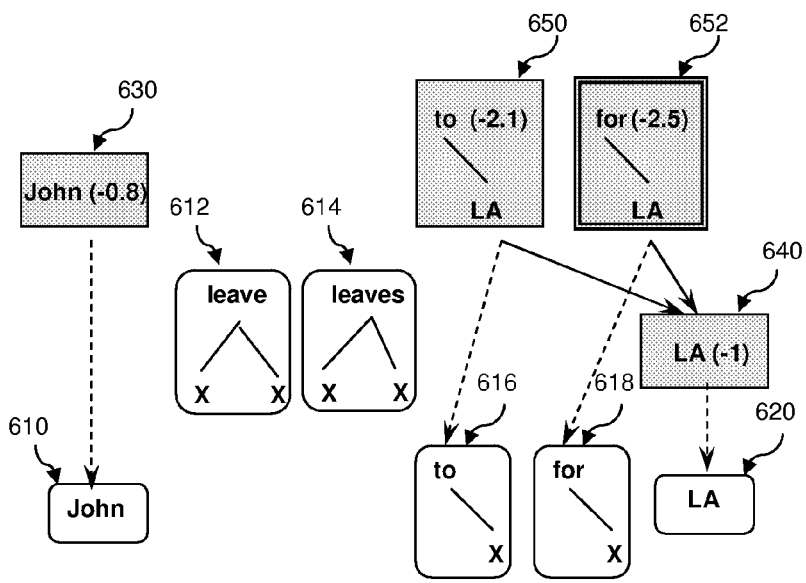

Note that each new treelet includes all non-wildcard tokens in the prior treelets by the combination of which the new treelet is generated. As a result, the new treelet is a representation of a combination of the source sequences associated with the prior treelets. For example, as shown in FIG. 6D, replacing the wildcard in treelet 616 with theory 640 generates a new treelet 650. The new treelet 650 now represents the combination of two source tokens, i.e., "去" and "洛杉矶", which are associated with prior treelets 616 and 640, respectively.

In general, theories and treelets are not limited to one-time use during decoding. In practice, each theory can be combined with different treelets for multiple times as long as it is a valid combination that conforms to operation rules. For example, referring to FIG. 6E, when theory 640 is combined with treelet 616, a new theory 650 is generated, with a log probability score of −2.1. Alternatively, when theory 640 is combined with another treelet 618, a different new theory 652 is generated, with a lower log probability score of −2.5.

As treelet combination continues, the decoder 140 obtains one or more treelets that represent the entire input string. In step 529, these full dependency trees are output by the decoder to the k-best generator 150 for k-best generation.

Figure 6F:
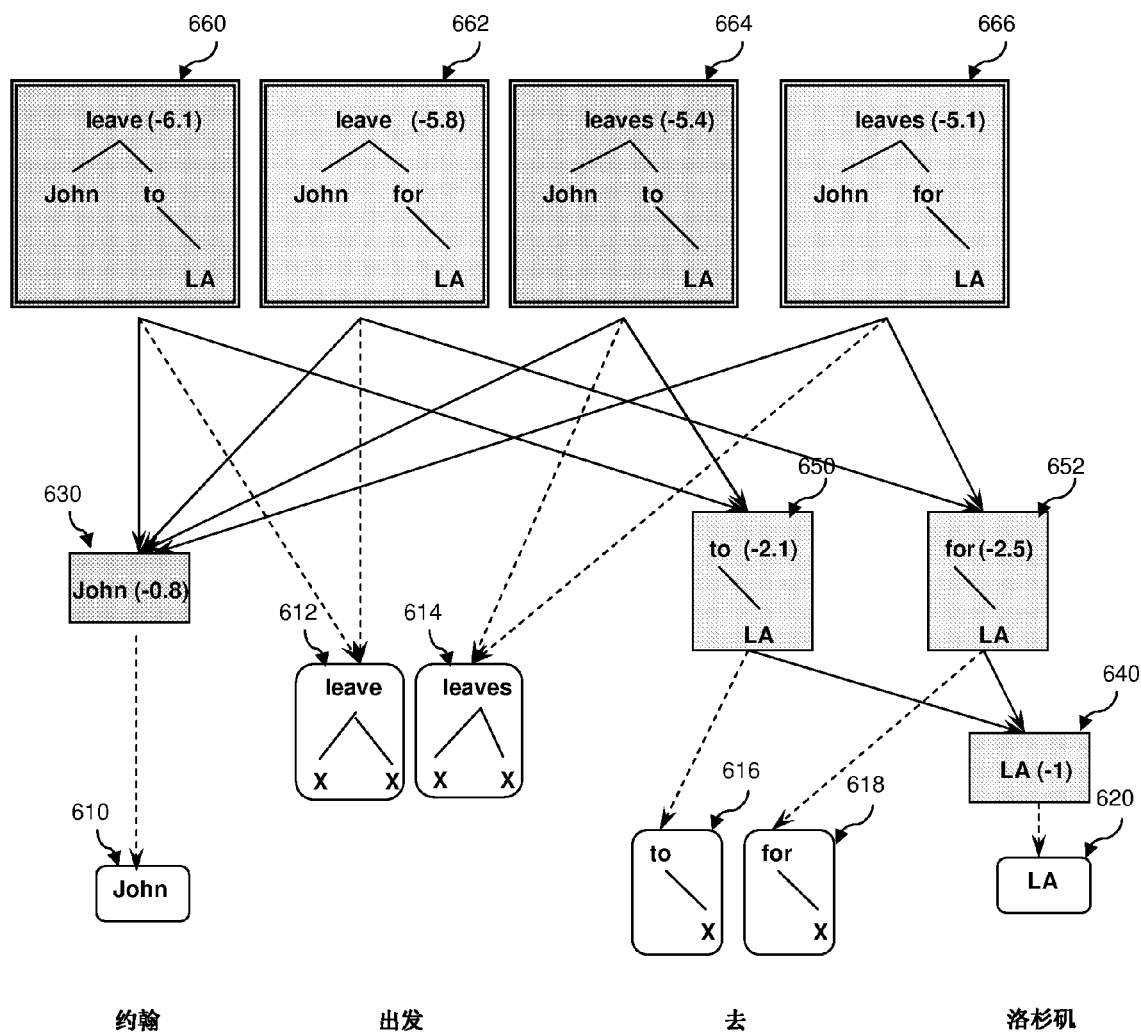

Referring to FIG. 6F, in this decoding example, at least four dependency trees are generated at the top level to represent the entire input string. For example, tree 660 appears as the result of combining theory 630, treelet 612, and theory 650. As a full representation of the input string "约翰出发去洛杉矶", this tree carries an overall log probability score of −6.1. In comparison, tree 666, also a full representation of the input string, carries a higher log probability score of −5.1, indicating that at this point in decoding, "John leaves for LA" is considered by the decoder 140 as a better translation than "John leave to LA".

Note that the decoder 140 illustrated in FIGS. 5B and 6A-6F employs an algorithm that essentially relies on exhaustive enumeration of input sequences and transfer rules to generate the forest of target dependency trees. In some implementations, the decoder 140 may adopt alternative algorithms of a lower order of computational complexity for the same purpose of generating the forest.

Referring to FIG. 7A, for example, pseudo code 700 logically describes an alternative decoding algorithm. In this pseudo code, string length N denotes the total number of tokens in an input string. Span [i,j] represents a subsequence formed by the $i^{th}$ to the $j^{th}$ tokens in the input string, with span length K being the number of tokens in this span (i.e., j−i+1).

According to this algorithm, the decoder 140 incrementally generates the forest of target dependency structures by iterating span length K from 1 to N. At each iteration, the decoder 140 scans the input string for a set of subsequences [i,j] of exactly K tokens, identifies for each subsequence [i,j] a set of transfer rules (referred to herein as Q) completely aligned to the span, and uses Q to form target treelets that represent the set of subsequences of the input string and compute associated scores for treelets. The decoder 140 also identifies a set of transfer rules (referred to herein as P) that are partially aligned to the span [i,j], which provides clues for the identification of Q in the upcoming iterations.

Here, a transfer rule is completely aligned to a span [i,j] if each token in the span is aligned to exactly one (although not necessarily a different one) token/wildcard in the completely aligned source side of the rule. A transfer rule is partially aligned to a span [i,j] if only a prefix of the source side of the rule is completely aligned to the span [i,j]. In some cases, a transfer rule partially aligned to a particular span [i,j] may be completely aligned to a larger span. The determination of completely and partially aligned rules is further illustrated in the following example.

Referring to FIG. 7B, an input string "约翰出发去洛杉矶" has a total of four indexed tokens, i.e., "约翰", "出发", "去", and "洛杉矶". At K=1, the decoder recognizes four single-token subsequences and determines, for each subsequence, a corresponding Q, P, and target treelets. For example, as shown in the table, Q for span [1, 1] includes rule "约翰=>John" that is completely aligned to span [1, 1] (i.e., "约翰"). P includes rule "X1·出发X2=>X1—leaves—X2" that is partially aligned to span [1, 1] because only a prefix of the rule (i.e., X1) is completely aligned to span [1, 1]. Based on the available rules in Q, the decoder generates a forest of target treelets (including "John"), at least some of which are used in combination with others to build larger treelets in the next round of iteration.

In some examples, during decoding, the decoder 140 performs a pruning procedure that makes use of scores (e.g., probability scores) of target treelets to limit the size of the forest for resource optimization. Efficient pruning can be achieved in many ways, including e.g., using a cube pruning technique described by Chiang in A HIERARCHICAL PHRASE-BASED MODEL FOR STATISTICAL MACHINE TRANSLATION, *Proceedings of the* 43*th Annual Meetings of the Association for Computational Linguistics*, 2005, As previously mentioned, the probability score of a treelet can include a language model component, and a dependency language model component. In some implementations, the probability score can include components in consideration of additional decoding features, including for example:

Probability of the source side given the target side of a rule;
Probability of the target side given the source side of a rule;
Word alignment probability;
Number of target words;
Number of concatenation rules used;
N-gram language model score;
Dependency language model score;
Discount on ill-formed dependency structure.

Each feature is factored in the score, for example, according to the following formula:

Score=$w_1$·log(P(source|target)+$w_2$·log(P(target|source))+$w_3$·log(P(word alignment))+ . . . +$w_6$·log(LM score)+$w_7$·log(dependency LM score)+ . . .

where $w_1$ through $w_8$ represents the weight for each of the eight score components listed above, respectively. In some examples, the weights $w_1$ through $w_8$ are determined by an optimization process.

For illustrative purpose, two examples of score components are provided below.

The first example relates to the first component in the above score formula, i.e., P (target|source), the probability of the target side given the source side of a rule. This score component is calculated based on statistics gathered during rule extraction. For example, referring to Table 1 in FIG. 4I, if R8 and R9 are the only two rules associated with source sequence "$X_1$ 出发 $X_2$"in the entire grammar, it is then calculated that the probability of applying target treelet in R8 as corresponding to "$X_1$ 出发$X_2$" is 0.6, while the probability of applying target treelet in R9 is 0.4.

The second example relates to the dependency LM score component. For the full tree 666 in FIG. 6F, a 2-gram dependency LM score for the tree can be calculated as $P_T = P_{Head}$(leaves)* $P_{Left}$(John|leaves-as-head)* $P_{Right}$(for|leaves-as-head)* $P_{Right}$(LA|for-as-head)

where $P_T$ is the dependency LM score for the tree, $P_{Head}$ (leaves) is the probability of "leaves" being a head, $P_{Left}$ (John|leaves-as-head) is the probability of "John" being a left child given "leaves" as the head, $P_{Right}$ (for|leaves-as-head) is the probability of "for" being a right child given "leaves" as the head, and $P_{Right}$(LA|for-as-head) is the probability of "LA" being a right child given "for" as the head.

In general, for dependency LM, history on which probability is conditioned is higher order. For example, the probability of a given node $x_i$ depends on the content of multiple other nodes (e.g., two nodes in a 3-gram dependency LM). In some implementations, these two nodes are the direct parent and the first left sibling of $x_i$. In some implementations, these two nodes are the direct parent and the grandparent of $x_i$. In some other implementations, these two nodes are the first and second left (or right) siblings of $x_i$.

4.2 K-Best Generation

In some implementations, the k-best generator 150 adopts a similar approach to the one described by Huang et al. in BETTER K-BEST PARSING, *Proceedings of the 9$^{th}$ International Workshop on Parsing Technologies*, 2005, the disclosure of which is incorporated here by reference.

4.3 Re-Ranking

In some implementations, the k-best (e.g., 1000-best) full target trees can be re-scored using a different language model from the one used in decoding, e.g., by replacing a 3-gram LM score with a 5-gram LM score computed offline. The k-best full target trees can also be re-scored using a different (e.g., a higher-order) dependency language model. In some implementations, local context and background information is also incorporated in language models for re-ranking purpose. In general, re-ranking can give rise to 1 to 2 percentage points of improvement in accuracy over decoding.

5 Experiments

For comparison purposes, translation tests were conducted on two systems, including:

a baseline system, which is a replicate of an existing Hiero system built on a string-to-string model (described in Chiang, A HIERARCHICAL PHRASE-BASED MODEL FOR STATISTICAL MACHINE TRANSLATION, *Proceedings of the* 43$^{rd}$ *Annual Meeting of the ACL*, 2005);

a string-to-dependency system which incorporates some of the methods described above to generate target trees using a dependency language model.

Both systems are tuned on BLEU (Papineni et al., BLEU: A METHOD FOR AUTOMATIC EVALUATION OF MACHINE TRANSLATION, IBM research Report, 2001), and evaluated on both BLEU and Translation Error Rate (TER) (Snover et al., A STUDY OF TRANSLATION EDIT RATE WITH TARGETED HUMAN ANNOTATION, *Proceedings of Association for Machine Translation in the Americas*, 2006), so that over-tuning on one metric could be detected.

The bilingual training data includes part of the NIST 2006 Chinese-English large track data, as well as some LDC corpora collected for the DARPA GALE program (LDC2005E83, LDC2006E34 and LDC2006G05). It contains about 178M and 191M words in source and target languages, respectively. Dependency rules were extracted from a subset of eight corpora having about 35M/41M words, and the rest of the training data were used to extract phrasal rules. The English side of this subset was also used to train a 3-gram dependency LM. Traditional 3-gram and 5-gram LMs were trained on a corpus of 6G words composed of the LDC Gigaword corpus and text downloaded from Web (Anonymous). The weights were tuned on NIST MT05 and tested on MT04.

Table 2 shows the number of transfer rules extracted from the training data for the tuning and test sets. The constraint of well-formed dependency structures in the string-to-dependency system greatly reduced the size of their rule set (search space) to less than 20% of that in the baseline system.

TABLE 2

Number of extracted transfer rules

| Model | # of Rules |
|---|---|
| Baseline | 140M |
| String-to-dependency | 27M |

Table 3 shows the BLEU and TER scores on MT04. On decoding output, the string-to-dependency system using a 3-gram language model achieved 1.48 point improvement in BLEU and 2.53 point improvement in TER compared with the baseline string-to-string system. After 5-gram re-ranking, the string-to-dependency system achieved 1.21 point improvement in BLEU and 1.19 improvement in TER.

TABLE 3

BLEU and TER scores on test sets

| | BLEU % | | TER % | |
|---|---|---|---|---|
| Model | lower | mixed | lower | mixed |
| Decoding (3-gram LM) | | | | |
| Baseline | 38.18 | 35.77 | 58.91 | 56.60 |
| String-to-dependency | 39.52 | 37.25 | 56.27 | 54.07 |
| Re-ranking (5-gram LM) | | | | |
| Baseline | 40.53 | 38.26 | 56.35 | 54.15 |
| String-to-dependency | 41.60 | 39.47 | 55.06 | 52.96 |

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

It is to be understood that the foregoing description is intended to illustrate and not to limit the scope of the invention. Other embodiments are within the scope of the following claims.

What is claimed is:

1. A method for computer-assisted translation from a source language to a target language, the method comprising:
   accepting a plurality of rules, each rule forming an association between a representation of a sequence of source language tokens with a corresponding tree-based structure in the target language,
   wherein the tree-based structure for each of at least some of the rules represents one or more asymmetrical relations within a plurality of target tokens associated with the tree-based structure and provides an association of the plurality of target tokens with the sequence of source language tokens of the rule; and
   decoding, sing a computer, an input sequence of source tokens according to the plurality of rules to generate a representation of one or more output sequences of target language tokens, including
   for each of at least some sub-sequences of the input sequence of source tokens, determining a tree-based structure associated with the sub-sequence according to a match to one of the plurality of rules.

2. The method of claim 1 wherein the tree-based structure for each rule of the plurality of rules comprises a dependency tree.

3. The method of claim 2 wherein each of at least some of the dependency trees are represented in a training corpus of target language token sequences.

4. The method of claim 2 wherein each of at least some of the dependency trees comprise a plurality of nodes, each of the nodes being associated with a target language token and being associated with a sequence of one or more source language tokens.

5. The method of claim 4 wherein each of at least some of the dependency trees comprises a node associated with a wildcard representing an association with an unspecified sequence of source language tokens.

6. The method of claim 1 wherein determining a tree-based structure associated with the sub-sequence according a match to one of the plurality of rules comprises combining a plurality of tree-based structures each determined to be in association with a portion of the sub-sequence.

7. The method of claim 6 wherein combining the plurality of tree-based structures comprises associating one of the tree-based structures of the plurality of tree-based structures with a wildcard associated with a node of another tree-based structure of the plurality of tree-based structures.

8. The method of claim 1 wherein each of the plurality of tree-based structures is associated with a target language model score that depends on the tree-based structure and target language tokens associated with the tree-based structure.

9. The method of claim 8 wherein decoding the input sequence of source tokens includes combining target language model scores associated with a plurality of tree-based structures.

10. A method for computer-assisted translation from a source language to a target language, the method comprising:
   accepting a plurality of rules, each rule forming an association between a representation of a sequence of source language tokens with a corresponding tree-based structure in the target language,
      wherein the tree-based structure for each rule satisfies a tree-based constraint and includes at least one target language token associated with one or more source language tokens in the sequence of source language tokens for the rule; and
   decoding, using a computer, an input sequence of source tokens according to the plurality of rules to generate a representation of one or more output sequences of target language tokens, including
      for each of at least some sub-sequences of the input sequence of source tokens, determining a tree-based structure associated with the sub-sequence according to a match to one of the plurality of rules, and
      for each of at least some sub-sequences of the input sequence of source tokens, selecting for combination a subset of determined tree-based structures, each associated with a sub-sequence, such that a tree-based structure formed as a combination of the subset of partial trees satisfies the tree-based constraint, and determining the tree-based structure as the combination of the selected subset of tree-based structures.

11. The method of claim 10 wherein the tree based constraint comprises membership in one of a plurality of specified classes of tree-based structures.

12. The method of claim 11 wherein the plurality of specified classes of tree-based structures include a class of fixed tree-based structures, each fixed tree-based structure including a determined head.

13. The method of claim 12 wherein, for at least some fixed tree-based structures, the fixed tree-based structure further includes at least one child of the determined head, each child of the determined head being a complete tree-based structure without wildcards.

14. The method of claim 11 wherein the plurality of specified classes of tree-based structures include a class of floating tree-based structures, each floating tree-based structure having an undetermined head and at least one child of the undetermined head, each child of the undetermined head being a complete tree-based structure without wildcards.

15. The method of claim 10 wherein said selecting for combination a subset of determined tree-based structures includes selecting inputs compatible with one of a plurality of operators.

16. The method of claim 10 wherein for each rule of the plurality of rules, the tree-based structure in the target language comprises a dependency tree.

17. The method of claim 16 wherein each of the dependency trees includes one or more nodes each associated with a target language token.

18. The method of claim 10 wherein each rule of the plurality of rules forms a direct association between the sequence of source language tokens and the corresponding tree-based structure in the target language.

19. A method for computer-assisted translation from a source language to a target language, the method comprising:
   accepting a plurality of rules, each rule associating a representation of a source sequence with a corresponding tree-based structure in the target language, wherein
      the tree-based structure including at least one target language token associated with a source token in the source sequence, and
      the tree-based structure is associated with a target language model score that depends on the tree-based structure and one or more target language tokens associated with the tree-based structure; and
   decoding, using a computer, an input sequence of source tokens according to the plurality of rules to generate a representation of one or more output sequences of target language tokens, including for each of multiple sub-sequences of the input sequence,
      generating a tree-based structure associated with the sub-sequence according to the plurality of rules, including determining a score associated with the generated tree-based structure that includes a language model component based on one or more language model scores of tree-based structures of the rules, and
      determining whether to discard the generated tree-based structure based on the determined score.

20. The method of claim 19 wherein the language model component comprises a dependency tree based language model component.

21. The method of claim 19 wherein generating the tree-based structure associated with the sub-sequence includes combining multiple tree-based structures determined for corresponding portions of the sub-sequence, and wherein determining the score for the generated tree-based structure includes combining scores for the multiple tree-based structures.

22. The method of claim 19 wherein decoding the input sequence further includes generating a full tree structure associated with the entirety of the input sequence using generated tree structures that were not determined to be discarded.

23. The method of claim 22 wherein decoding the input sequence further includes generating the one or more output sequences in the target language based on the full tree structure.

24. A method for forming a plurality of rules for computer-assisted translation from a source language to a target language, the method comprising:
   accepting a training corpus comprising a plurality of paired token sequences, one sequence of the pair being a sequence of source language tokens and another sequence of the pair being a sequence of target language tokens;
   for each of the plurality of paired token sequences,
      identifying a tree-based structure corresponding to the sequence of source language tokens of the paired token sequence, the tree-based structure representing one or more asymmetrical relations within a plurality of target tokens associated with the tree-based structure and provides an association of the plurality of target tokens with the sequence of source language tokens of the rule
      for at least some of the paired token sequences, identifying one or more partial tree-based structures, the partial tree-based structure being formed by substituting a first part of the tree-based structure with an element representing an unspecified sequence of source language tokens, the first part of the tree-based structure corresponding to a first part of the sequence of source language tokens of the paired token sequence; and forming, using a computer, the plurality of rules such that each rule is associated with either one of the identified tree-based structures corresponding to a sequence of source language tokens of a paired token sequence or one of the partial tree-based structures.

25. The method of claim 24 wherein each of the tree-based structures comprises a dependency tree, and each of the partial tree-based structures comprises a dependency tree.

26. The method of claim 24 wherein the first part of the tree-based structure satisfies a tree-based criterion, and the partial tree-based structure satisfies the tree-based criterion.

* * * * *